April 29, 1969
G. C. VIETH, JR
3,441,727
FUNCTION GENERATOR FOR SIMULTANEOUSLY PRODUCING ELECTRICAL
WAVE FORMS OF LIKE WAVE SHAPE AND OF
PREDETERMINED PHASE DISPLACEMENT
Filed Feb. 12, 1965

INVENTOR
GEORGE C. VIETH, Jr.

ATTORNEYS

United States Patent Office 3,441,727
Patented Apr. 29, 1969

3,441,727
FUNCTION GENERATOR FOR SIMULTANEOUSLY PRODUCING ELECTRICAL WAVE FORMS OF LIKE WAVE SHAPE AND OF PREDETERMINED PHASE DISPLACEMENT
George C. Vieth, Jr., Springfield, Va., assignor to Melpar, Inc., Falls Church, Va., a corporation of Delaware
Filed Feb. 12, 1965, Ser. No. 432,323
Int. Cl. G06f 1/02
U.S. Cl. 235—197    9 Claims

ABSTRACT OF THE DISCLOSURE

A function generator generates waveforms of like wave shape and fixed phase displacement by initially generating a triangular waveform and supplying that waveform to circuitry for synthesizing related triangular waveforms of different phase and having reference levels selected in accordance with the signal functions to be generated. These related waveforms are supplied to gates where various segments are selectively passed or blocked and the passed segments are linearly combined to provide the desired output waveforms or functions.

---

The present invention relates generally to function generators, and, more particularly, to a function generator in which a wave is synthesized in response to two other waves wherein alternate portions of the other waves are successively passed to an output terminal.

Typically, the derivation of waves, such as sinusoids, involves the use of reactive components. Reactive components are utilized in both the sinusoidal source and in shifting the phase of a sinusoid. For extremely low frequency applications and for waveforms other than sinusoids, if wave shape is to be preserved, reactances must be avoided. This is because reactances adapted to control extremely low frequencies, for example, twenty cycles or less, are of such large size as to be physically unmanageable, with the result that generally the use of inadequate reactances is attempted causing non-linear control and unwanted distortions of the waves.

Because of the cited factors, the derivation of non-sinusoidal waveforms and sinusoidal waveforms of extremely low frequency have generally relied upon D.C. wave-shaping circuit techniques. In many instances, such signals are derived by utilizing electro-mechanical elements, such as shaped potentiometer cards. The potentiometer sliders are driven by variable speed motors if waves of differing frequencies are to be derived. A principal difficulty with the derivation of sinusoidal and non-sinusoidal functions with electro-mechanical potentiometers is the noise and wear inherent in the movement of the slider across the resistance card. In addition, accuracy limitations are imposed by the degree of exactness to which the resistance card can be shaped.

To derive signals displaced from each other by a predetermined amount, at the low frequency end of the spectrum, it has generally been necessary in the prior art to employ potentiometers having a pair of sliders displaced from each other by an angle representative of the desired electrical phase shift. Voltages tapped from the sliders are linearly combined to provide the desired phase relationship. The use of a pair of sliders on a potentiometer has been found necessary because of the problems mentioned regarding reactances at these frequencies. Even at higher frequencies, phase shifting is a considerable problem in that the impedance of the reactance is a function of frequency. Thus, if the frequency of the wave being coupled through the system changes, its phase and amplitude are shifted with respect to a reference.

According to the present invention, difficulties encountered in the prior art derivation of wave shapes are overcome with an all-electronic system employing only D.C. coupling. Because only D.C. coupling is utilized in the system, the problems encountered with the variable effects of reactances on waves of different frequencies are obviated. In addition, problems inherent with physically unattainable large reactances at extremely low frequencies for coupling purposes are obviated. Also, noise, wear and accuracy limitations imposed by the electro-mechanical poteniometer approach are circumvented.

The present invention achieves these results by employing a triangular wave generator that synthesizes four other triangular waves of substantially the same wave shape and frequency, F, as the parent triangular wave. The first two of the synthesized triangular waves are the mirror image of each other and the third and fourth synthesized triangular waves are mirror images of each other. The first pair of waves is adjusted relative to the second pair of waves by a D.C. level adjusting network so that maximum amplitudes of the second pair occur simultaneously with minimum amplitude occurrences of the first pair of waves. The first and second triangular synthesized waves are sequentially gated through a common circuit on alternate cycles to form a triangular wave having one-half the frequency, $F/2$, of the originally derived triangular wave. The third and fourth triangular waves are simularly gated to provide another triangular wave of frequency $F/2$. The two waves of frequency $F/2$ are displaced by 90° from each other in response to the synthesizing operation.

To attain sinusoids having the same frequency and phase as the derived triangular waves, the triangular waves are applied to diode "functions fitters" or modifiers of a type well known in the art. Thereby, it is possible to derive a pair of sinusoidal waves having a phase displacement of 90°, no matter what the basic frequency of the triangular waves, without employing reactances of electro-mechanical devices.

To gate the triangular waves, it is necessary to provide a pair of square waves at one-half the basic triangular wave frequency, which square waves are phase-displaced from each other by 90°. I have found that such gating waves are readily generated by deriving square waves of frequency F. These square waves are applied through a frequency divider to derive a second series of square waves having transitions coincident with every other transition of the first-named square wave. The first and second square waves are applied to a digital computer logical element, known as a binary half-adder, which derives an output of one value when its inputs are alike and an output of another value when its inputs are different. Since the inputs to the binary half-adder are alike and different at the same frequency as the output of the frequency divider, the divider output frequency is $F/2$. The output deriving from the half-adder is displaced from the output of the frequency divider by 90° since the square wave of the frequency F has a transition that is exactly between the transitions of the square wave of frequency $F/2$. Square waves of these phases, when applied to the half-adder inputs, result in an output from the adder that is displaced in phase by 90° relative to the frequency divider output.

It is, accordingly, an object of the present invention to provide a new and improved function generator.

It is another object of the present invention to provide a new and improved function generator that employs only D.C. coupling and yet requires no electro-mechanical components.

It is a further object of the present invention to provide a new and improved function generator for deriving waves of any frequency over a wide frequency spectrum merely by changing the value of a single component in a linear manner.

It is still another object of the present invention to provide a new and improved system for deriving a pair of waves having a predetermined phase displacement not affected by frequency.

It is still another object of the present invention to provide a new and improved triangular wave generator.

Yet another object of the present invention is to provide a new and improved system for synthesizing a pair of triangular waves that are phase displaced from each other by 90°.

A further object of the present invention is to provide a system for deriving a pair of square waves having a phase displacement of 90°.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a preferred embodiment of the present invention;

FIGURES 2a–2i are waveforms that exist in the circuit of FIGURE 1; and

FIGURE 3 is a circuit diagram of a preferred embodiment of one of the gates employed in FIGURE 1.

Reference is now made to FIGURE 1 of the drawings wherein a triangular wave of fixed amplitude and frequency is derived by circuit 11 which comprises a feedback network including time base generator 12, threshold detector 13 and bistable flip-flop 14. Time base generator 12, which is preferably a Miller integrator type network, derives triangular waves in response to the square waves deriving from flip-flop 14. The triangular waves deriving from generator 12 are fed to threshold detector 13 that derives a pulse each time the output of generator 12 attains a predetermined maximum amplitude. The pulse is coupled to flip-flop 14 to switch the state thereof.

If it is assumed that flip-flop 14 is presently deriving a square wave having a positive voltage level, this square wave is coupled to time base generator 12 and causes the integrating capacitor therein to accumulate charge in a positive direction. Since this charge accumulation is linear, the output of generator 12 is a linear function of the time during which flip-flop 14 has been deriving a positive voltage.

When the upper level, $E_2$, of threshold detector 13 has been attained, the detector derives an output that switches flip-flop 14 to a negative voltage. The negative voltage output of flip-flop 14 is coupled back to the input of time base generator 12 and initiates linear discharge of the integrating capacitor therein at the same rate as the charge build-up. When the capacitor in time base generator 12 has been discharged to a predetermined level, the voltage deriving from generator 12 reaches the minimum threshold level of detector 13 and the detector again derives an output pulse.

The output pulse resets bistable flip-flop 14 to its positive output voltage which causes the capacitor in time base generator 12 to again start accumulating charge. Thus, there is derived from time base generator 12 a periodic triangular wave varying between the maximum and minimum values of threshold detector 13, $E_2$ and $E_1$, respectively. The wave derived from generator 12 is generally of a relatively low peak to peak amplitude, on the order of 1.5 volts, for example, and the variations are considered to be between two positive voltages.

The frequency of the wave deriving from generator 12 is varied in a linear manner merely by varying the value of the integrating capacitor or a resistance within time base generator 12. Since the frequency variations of generator 12 can thereby be varied in a linear manner by linear variations of resistance and capacitance, problems encountered in prior art tuned circuit devices wherein frequency changes are logarithmic are obviated. Of course, for a system of wide frequency range, it is desirable to have linear, rather than logarithmic changes in frequency as a function of impedance change, because of the high resolution attainable throughout the frequency range of interest.

The triangular wave deriving from time base generator 12, having amplitude excursions between $E_1$ and $E_2$, is applied to network 15 that synthesizes four different triangular waves. Network 15 includes four D.C. operational amplifiers, three of which have a gain of minus one and one of which has a gain of plus one. Amplifier 16, having a gain factor of plus one, is D.C. coupled with the output of generator 12, and its own output is D.C. coupled to the input of inverting amplifier 17. To provide a waveform at the output of isolation amplifier 16 that varies between 0 and $(E_2-E_1)$, the output level of amplifier 16 is offset from 0 by a constant factor of $-E_1$. This is attained by connecting the constant amplitude negative D.C. voltage at terminal 18 to the amplifier output through voltage level control resistor 19.

Since amplifier 17 inverts the phase of the signal deriving from amplifier 16, the unmodified voltage deriving from the former amplifier varies between 0 and $-(E_2-E_1)$. The output voltage of amplifier 17 is shifted upwardly by a constant D.C. voltage by an amount equal to $(E_2-E_1)$. This is accomplished by connecting the positive D.C. voltage at terminal 21 to the output of amplifier 17 through resistor 22. The value of the resistor is adjusted so that the triangular wave actually deriving from inverter amplifier 17 varies between a level of 0 and $(E_2-E_1)$. Because of the phase inverting action of amplifier 17 and the offsetting properties of the D.C. voltage at terminal 21, the output of amplifier 17 is of the positive maximum value, $(E_2-E_1)$, when the output of amplifier 16 is zero. Thus, the outputs of amplifiers 16 and 17 are of like frequency and wave shape, and one increases while the other decreases and vice-versa.

To provide negative excursions which are mirror images of the waveforms deriving from amplifiers 16 and 17, D.C. operational amplifiers 23 and 24 are cascaded with each other and with the output of time base generator 12. Inverting amplifier 23 derives a triangular voltage that varies between $-E_1$ and $-E_2$. To adjust these negative going waves so that their maximum positive excursion is zero volts, a positive D.C. source is connected to terminal 25 and is coupled through resistor 26 to the output of inverting amplifier 23. Thereby, the actual output wave deriving from amplifier 23 can be considered as varying between zero and $-(E_2-E_1)$ volts since the D.C. voltage coupled from terminal 25 offsets the amplifier output by $+E_1$ volts.

The triangular wave deriving from amplifier 23 is coupled to inverting amplifier 24, the unmodified output of which varies between zero and $+(E_2-E_1)$. To adjust the level of amplifier 24, a D.C. level setting network including terminal 27, responsive to a negative D.C. voltage and resistor 28 is provided across the output of amplifier 24. The negative voltage suplied to the output of amplifier 24 from terminal 27 offsets the amplifier output by $-(E_2-E_1)$ so that a wave extending between zero and $-(E_2-E_1)$ is derived.

The waveshapes deriving from unity gain amplifiers 16, 17, 23 and 24 are respectively shown in FIGURES 2d, 2f, 2e and 2g. It is noted from FIGURES 2d–2g and FIGURE 2a, the waveform deriving from bistable flip-flop 14, that the triangular waves produced by amplifiers 16, 17, 23 and 24 are of like frequency to the output of flip-flop 14. In addition, it is noted that the outputs of amplifiers 16 and 23, shown in FIGURES 2d and 2e, respectively, are the mirror images of each other and that the outputs of amplifiers 17 and 24, respectively, shown in FIGURES 2f and 2g, are the mirror images of each other. It is also noted that whenever the waveforms in FIGURES 2d and 2e, indicative of the outputs of amplifiers 16 and 23, are at a minimum value or level, waveforms 2f and 2g are at a maximum value or level. Attention is also directed to the fact that while four different relationships exist between the waves shown by FIGURES 2d–2g, each of the waves is phase displaced by 180° or 0°. There is no 90° phase displacement between any of the waves shown in FIGURES 2d–2g.

To provide a pair of triangular waves having a phase displacement of 90°, the outputs of amplifiers 16 and 23 are combined in gate 29 while the outputs of amplifiers 17 and 24 are combined in gate 30. Gate 29 combines each alternate cycle of the output of amplifier 16 with the other alternate cycle of the output of amplifier 23 to derive the waveform shown in FIGURE 2h. Thus, gate 29 is effective to pass the first cycle of the triangular wave deriving from amplifier 16, as shown in FIGURE 2d, and ineffective to pass the first cycle of the output of inverting amplifier 23, shown in FIGURE 2e. During the next cycle, gate 29 blocks the triangular wave output of amplifier 16 and passes the negative going output of amplifier 23. In a similar manner, gate 30 combines every other cycle of the wave deriving from amplifier 17 with the alternate cycles of the negative going wave deriving from amplifier 24 to derive the waves shown in FIGURE 2i.

Thus, by linearly combining alternate half cycles of the positive and negative going triangular waves deriving from the amplifiers in circuit 15, gates 29 and 30 derive a pair of triangular waves that are phase displaced from each other by 90°. The 90° phase displacement is readily ascertained by inspecting the waveforms of FIGURES 2h and 2i where it is noted that the amplitude of each is zero when the amplitude of the other is maximum both in the positive and negative directions. The waveforms illustrated in FIGURES 2h and 2i are of one-half the frequency of the triangular wave applied to and deriving from the amplifiers in network 15.

To derive sinusoidal waves displaced from each other by 90° from the triangular waves deriving from gates 29 and 30, diode function generators 32 and 33 are provided. Function generators 32 and 33, respectively, responsive to the outputs of gates 29 and 30, may be of any well known type, such as those shown in Smith Patent 2,748,278.

To control gates 29 and 30 so that they are responsive to alternate half cycles of the triangular waves deriving from the amplifiers in network 15, it is necessary to derive a pair of square waves having a frequency equal to one-half the frequency of the square wave deriving from bistable flip-flop 14. It is essential that the transitions of one of the square waves of frequency F/2, where F is the frequency of the triangular wave deriving from generator 12, be coincident with the time period that the output of generator 12 takes to go from the voltage $E_1$ and back to the voltage $E_1$. This is accomplished by coupling the output of flip-flop 14, a square wave of frequency F, to bistable flip-flop (binary counter) 34. Thus, the output of bistable flip-flop 34 is a square wave of frequency $F/2$ where each transition of the flip-flop 34 output occurs simultaneously with each occurrence of the voltage level $E_1$ deriving from generator 12.

To derive a wave of frequency $F/2$ that is shifted in phase 90° relative to the output of flip-flop or frequency divider 34, the outputs of flip-flops 14 and 34 are combined in binary half-adder 35. Half-adder 35 is of the usual type wherein a negative constant voltage amplitude level is derived whenever its inputs are alike and a positive constant amplitude voltage level is derived whenever its inputs are different. Since the inputs to half-adder 35 from flip-flops 14 and 34 are respectively shown in FIGURES 2a and 2b, the phase of the half-adder output is shifted by 90° relative to the phase of the output of flip-flop 34, as indicated in FIGURE 2c.

That the 90° phase shift is effected may be seen by examining each of the four quarter cycles of the waveform shown in FIGURE 2b. During the first quarter cycle of the waveform shown in FIGURE 2b, the outputs of flip-flops 14 and 34 are alike so that the output of half-adder 35 is negative, as shown in FIGURE 2c. During the next quarter cycle of the waveform shown in FIGURE 2b the output of flip-flop 14 has changed to be of negative value so that the inputs to half-adder 35 are different and its output is therefore positive. During the third quarter cycle of the waveform shown in FIGURE 2b the outputs of flip-flops 14 and 34 are respectively positive and negative. In consequence, the inputs to half-adder 35 are of opposite polarity and its output is positive. During the fourth quarter cycle of the first cycle deriving from flip-flop 34, as illustrated in FIGURE 2b, the outputs of flip-flops 14 and 34 are both negative. Thus, the output of half-adder 35 is negative. In a similar manner, half-adder 35 continues to derive the wave shape shown in FIGURE 2c in response to succeeding cycles of the outputs of flip-flops 14 and 34.

By inspecting FIGURES 2b and 2c it becomes evident that the waveforms illustrated are displaced from each other 90°. This is because the wave shape shown in FIGURE 2c has a transition from its negative to its positive value exactly in the center of the positive half-cycle of the waveshape shown in FIGURE 2b. Similarly, the wave shape shown in FIGURE 2b has a negative transition exactly in the middle of the positive half cycle of the wave shown in FIGURE 2c.

The outputs of flip-flop 34 and half-adder 35 are applied separately to gates 29 and 30. Gates 29 and 30 are arranged so that they pass a positive voltage when their gating square wave input is positive and pass only a negative voltage when their gating square wave is negative, as is shown in FIGURES 2h and 2i. Thus, during the positive half-cycle of the wave shape deriving from flip-flop 34, as illustrated in FIGURE 2b, the positive voltage deriving from amplifier 16 is coupled through gate 29 and the negative voltage deriving from amplifier 23 is blocked. During the following, negative half cycle of the output voltage deriving from flip-flop 34, the negative output voltage of inverting amplifier 23 is passed through gate 29 and the gate blocks the positive output voltage of inverting amplifier 16. Gate 30 responds exactly in an identical manner to the outputs of amplifiers 17 and 24 under the control of the square wave gating voltage derived from half-adder 35.

Reference is now made to FIGURE 3 of the drawings where there is disclosed one embodiment of the circuit that can be utilized for either gate 29 or 30. For purposes of illustration it is assumed that the gate shown in FIGURE 3 responsive to the outputs of inverting amplifiers 16 and 23 and the square wave deriving from flip-flop 34; that is, gate 29. The 0 to 1.5 volt triangular wave deriving from amplifier 16 is coupled to input terminal 36 while the 0 to −1.5 volt output of amplifier 23 is coupled to input terminal 37. The voltages at terminals 36 and 37 are fed through separate decoupling resistors 38 and 39 to the anode and cathode of diodes 41 and 42, respectively. The cathode and anode of diodes 41 and 42 are connected to a common junction, terminal 43, that is responsive to the square wave gating voltage deriving from flip-flop 34. In a typical example, the output of counter 34, as applied to terminal 43, extends from −20 to +20 volts so that complete on and off switching of diodes 41 and 42 is attained.

Connected to terminal 43 are the cathode and an anode of diodes 44 and 45, respectively. The anode of diode 44 and the cathode of diode 45 are respectively connected to the input terminals of D.C. operational inverting amplifiers 46 and 47, each having a gain of −1. The outputs of amplifiers 46 and 47, together with the voltages at the anode of diode 41 and a the cathode of diode 42 are linearly combined by being coupled to the input of D.C. operational, summation amplifier 48 through resistors 51–54, from which the output of gate 29 is derived.

In operation, when the output of flip-flop 34 is a positive voltage, diodes 41 and 44 are back biased while diodes 42 and 45 are forward biased. Therefore, diode 42 is of relatively low impedance and the +20 volt level applied to its anode is coupled directly to resistor 54. The impedance through diode 42 is so much smaller than through resistor 39 that the input to resistor 54 may be considered as clamped at +20 volts. Similarly, the input to amplifier 47 through diode 45 may be considered as clamped at 20 volts. The output of amplifier 47 is, however, −20 volts. The minus voltage deriving from amplifier 47 is added with the positive voltage applied to resistor 54 and the values of resistors 53 and 54 are adjusted so the net voltage applied by them to amplifier 48 is now zero. At the same time, the triangular wave applied to terminal 36 is passed to the input of amplifier 48 through resistor 38 and 51. The +20 volt level applied to the cathode of diode 41 from flip-flop 34 back biases diode 41 sufficiently to effect the coupling described. The 20 volt level applied to the cathode of diode 41 from flip-flop 34 back biases diode 41 sufficiently to effect the coupling described. The +20 volts signal is also applied to the cathode of diode 44. Since, however, diode 44 is now back biased by the +20 volt source, a zero voltage is applied to the input of inverting amplifier 46, which therefore derives a zero voltage output. Thus, the only net voltage applied to the input of amplifier 48 is from the positive going triangular wave applied to terminal 36.

During the next half cycle of the square wave applied to terminal 43, when the output of flip-flop 34 is negative, the opposite relations occur so the negative triangular wave applied to terminal 37 is coupled to the input of amplifier 48 and the positive triangular wave applied to terminal 36 is blocked. Thus, the circuit illustrated in FIGURE 3 derives the waveform illustrated in FIGURE 2h in response to the outputs of inverting amplifiers 16 and 23 and the square wave output of flip-flop 34, as illustrated in FIGURE 2b.

While I have described and illustrated one specific embodiment of my invention, it will be clear that variation of the details of construction which are specifically illustrated and described may be resorted to without departing from the true spirit and scope of the invention.

I claim:

1. A function generator for synthesizing a pair of triangular electrical waveforms of frequency $F/2$ and of predetermined phase displacement in response to a triangular waveform having a frequency $F$, said generator comprising means responsive to said triangular waveform of frequency $F$ for simultaneously deriving first and second triangular waveforms of frequency $F$ and of mirror image relative to a first reference level and for simultaneously deriving third and fourth triangular waveforms of frequency $F$ and of mirror image relative to a second reference level, said first and second waveforms having peak values at a position in time at which said third and fourth waveforms have values corresponding to said second reference level, gating means for passing segments of the first waveform and of the second waveform in accordance with gating signal applied thereto, means for applying said first waveform and said second waveform to said gating means, means for linearly combining the passed segments of said first and second waveforms to derive one of said waveforms to be synthesized, further gating means for passing segments of the third waveform and of the fourth waveform in accordance with gating signal applied thereto, means for applying said third waveform and said fourth waveform to said further gating means, means for linearly combining the passed segments of said third and fourth waveforms to derive the second waveform to be synthesized, means responsive to the first-mentioned triangular waveform of frequency $F$ for deriving a square waveform of like frequency, means responsive to said square waveform for deriving therefrom a pair of square waveforms of frequency $F/2$ having said predetermined phase displacement, and means for applying said square waveforms of frequency $F/2$ to respective ones of said first-named and further gating means as the gating signals therefor to selectively gate segments of said first and second and of said third and fourth waveforms which upon linear combination produce said pair of phase displaced triangular waveforms to be synthesized.

2. A system for synthesizing a pair of electrical waveforms of predetermined frequency and 90° phase displacement, comprising means for simultaneously deriving first, second, third and fourth periodic waveforms of the same frequency and substantially the same shape, said first and second waveforms being mirror images relative to a first reference level, said third and fourth waveforms being mirror images relative to a second reference level, the maximum displacement of said first and second waveforms from said first reference level occurring simultaneously with minimum displacement of said third and fourth waveforms from said second reference level, means responsive to said first waveform and to said second waveform for passing every other excursion of the first waveform relative to said first reference level and for blocking all other excursions of the first waveform relative to said first reference level while blocking and passing the second waveform when the first waveform is respectively passed and blocked, means for linearly combining the passed segments of said first and second waveforms to derive the first waveform to be synthesized, means responsive to said third waveform and to said fourth waveform for passing every other excursion of the third waveform relative to said second reference level and for blocking all other excursions of the third waveform relative to said second reference level while blocking and passing the fourth waveform when the third waveform is respectively passed and blocked, and means for linearly combining the passed segments of said third and fourth waveforms to derive the second synthesized waveform, both of said means for passing and blocking including means for generating a pair of square waves displaced in phase by 90° to control the passing and blocking of said first, second, third, and fourth waveforms.

3. The system of claim 2 wherein said first and second reference levels coincide.

4. The system of claim 2 wherein said means for deriving said first, second, third, and fourth waveforms includes means for adjusting the amplitudes of said first and second waveforms relative to said first reference level and further includes means for adjusting the amplitudes of said third and fourth waveforms relative to said second reference level.

5. A system for synthesizing a pair of triangular waves of frequency $F/2$, said pair of triangular waves being displaced from each other by 90°, comprising means for deriving a triangular wave of frequency $F$, means responsive to said triangular wave of frequency $F$ for deriving first, second, third and fourth triangular waves of frequency $F$, said first and second waves being the mirror images of each other relative to a first reference level, said first and second waves each extending in only one direction from said first reference level and recurrently having said reference level as one of its amplitude levels, said third and fourth waves always being of opposite amplitudes relative to a second reference level common to said third and fourth waves, said third and fourth waves each extending in only one direction from said second reference level and recurrently having said second reference level as one of its amplitude levels, the maximum displacement of said third and fourth waves from said second reference level occurring substantially simultaneously with minimum displacement of said first and second waves from said first reference level, means for passing every other excursion of the first wave relative to said first reference level and for blocking all other excursions of the first wave relative to said first reference level while blocking and passing the second wave when the first wave is respectively passed and blocked, means for applying said first and said second waves to said means for passing and blocking, means for linearly combining the passed segments of said first and second waves to derive the first synthesized wave of frequency $F/2$, means for passing every other excursion of the third wave relative to said second reference level and for blocking all other excursions of the third wave relative to said second refereence level while blocking and passing the fourth wave when the third wave is respectively passed and blocked, means for applying said third and said fourth waves to the last-named means for passing and blocking and means for linearly combining the passed segments of said third and fourth waves to derive said second wave to be synthesized, wherein said means for deriving said first, second, third and fourth triangular waves of frequency F include means responsive to said first-named triangular wave of frequency F for deriving a first and a second gating wave of frequency $F/2$, said first and second gating waves being displaced from each other by substantially 90°, said means for passing said first and second triangular waves including a gating circuit responsive to one of said gating waves, and said means for passing said third and fourth waves including gating means responsive to said second gating wave.

6. The synthesizer of claim 5 further including first and second diode shaping means respectively responsive to said first and second synthesized triangular waves, each of said diode shaping means incluing means for shaping each of said synthesized triangular waves into a sine wave, said sine waves being displaced from each other by substantially 90°.

7. The system of claim 5 wherein said means for deriving first and second gating waves includes means responsive to said first-named triangular wave for deriving substantially square waves of frequency F, means desponsive to said square waves of frequency F for deriving square waves of frequency $F/2$, and means responsive to said square waves of frequency F and $F/2$ for deriving a square wave having one amplitude level when said square waves of frequency F and $F/2$ are of a first predetermined amplitude and for deriving a second amplitude level when the square waves of frequency F and $F/2$ are of a second relative predetermined amplitude.

8. Apparatus for simultaneously generating a plurality of phase displaced electrical waveforms of like waveshape and common repetition frequency, said waveforms displaced from one another by a predetermined phase angle, said apparatus comprising:

linearly variable time base generating means for producing a triangular waveform having a frequency F, means responsive to said triangular waveform of frequency F for conversion thereof to a square waveform of like frequency, means responsive to said square waveform of frequency F for division thereof to produce a square waveform of frequency $F/n$ where $n$ is an integer greater than one, and $F/n$ is said common repetition frequency, means responsive to said square waveform of frequency of $F/n$ for generating phase displaced replicas thereof, equal in number to the number of said plurality of waveforms to be simultaneously generated, the phase displacement corresponding to said predetermined phase angle, means further responsive to said triangular waveform of frequency F for generating a plurality of phase displaced and amplitude offset triangular waveforms of like frequency, a plurality of gating means equal in number to the number of said plurality of waveforms to be simultaneously generated, responsive to preselected ones of said plurality of triangular waveforms for passage thereof in accordance with gating signal applied thereto, and means for applying said square waveforms of frequency $F/n$ having said predetermined phase displacement to different ones of said gating means as said gating signal therefor to selectively gate portions of the respective waveforms to which each gating means is responsive, for linear combination thereof to produce a plurality of triangular waveforms having the desired predetermined phase displacement.

9. The apparatus according to claim 8 further including means responsive to said plurality of triangular waveforms having the desired predetermined phase displacement for conversion thereof to waveforms of different waveshape from triangular waveshape, having the same predetermined phase displacement.

References Cited

UNITED STATES PATENTS

| 3,255,416 | 6/1966 | Stella | 328—22 |
| 3,262,069 | 7/1966 | Stella | 328—38 X |

FOREIGN PATENTS

| 1,103,403 | 3/1961 | Germany. |

MALCOLM A. MORRISON, *Primary Examiner.*

F. D. GRUBER, *Assistant Examiner.*

U.S. Cl. X.R.

328—22, 25, 27; 307—220, 228, 261